United States Patent [19]

Halpern

[11] 3,878,334

[45] Apr. 15, 1975

[54] DATA SYNCHRONIZING SYSTEMS

[75] Inventor: Peter H. Halpern, Longwood, Fla.

[73] Assignee: General Dynamics Corporation, St. Louis, Mo.

[22] Filed: Apr. 10, 1974

[21] Appl. No.: 459,834

[52] U.S. Cl. ......... 178/69.5 R; 178/DIG. 3; 325/42; 325/346; 329/122

[51] Int. Cl. ......................... H03d 3/18; H03d 3/24

[58] Field of Search ...... 178/69.5, DIG. 3; 325/346, 325/42, 52, 58; 329/122

[56] References Cited

UNITED STATES PATENTS

| | | | |
|---|---|---|---|
| 3,195,059 | 7/1965 | Adams | 329/122 |
| 3,209,271 | 9/1965 | Smith | 325/346 |
| 3,344,358 | 9/1967 | Riker | 325/346 |
| 3,397,360 | 8/1968 | Kaneko et al. | 325/346 |
| 3,420,956 | 1/1969 | Heightley et al. | 178/69.5 R |
| 3,453,383 | 7/1969 | Schafer | 178/DIG. 3 |
| 3,626,311 | 12/1971 | Kraybill | 325/346 |
| 3,714,595 | 1/1973 | Denenberg et al. | 325/346 |
| 3,758,861 | 9/1973 | De Jager et al. | 325/42 |

*Primary Examiner*—Malcolm A. Morrison
*Assistant Examiner*—Errol A. Krass
*Attorney, Agent, or Firm*—Martin Lu Kacher

[57] ABSTRACT

A bit synchronizer system is disclosed which is adaptive to varying input conditions such as noise and jitter of data signals particularly PCM telemetry signals. The signal to noise parameter of the input data signal is obtained from a matched filter having a response matched to signals which are orthogonal to the input data signal. This matched filter also detects transitions in the input data signal which are used to lock a phse locked loop. The loop generates a local clock which is synchronous with the incoming data and can be applied to detect the incoming data bits and reconstruct them into noise and jitter-free output data. Control signals are also extracted from the loop which represent the jitter (viz., the rate of change of the phase) of the input signal. The bandwidth of the loop is varied in accordance with the jitter and noise to signal parameters to the optimum bandwidth for the prevailing noise to signal ratio and jitter on the incoming data signal.

24 Claims, 12 Drawing Figures

DATA SYNCHRONIZING SYSTEMS

The present invention relates to synchronizing systems and particularly to data signal receivers which provide local clock signals synchronous with the bits of data in an incoming data bit stream, which clock signals may be used for demultiplexing and detecting the incoming data.

The present invention is especially suitable for use in telemetry data transmission systems for recovering synchronization information from incoming data which may have been effected by adverse signalling conditions such as noise, fading, interference, and frequency or phase shifts. The invention however, will be found generally useful whenever it is necessary or desirable to adapt a phase locked loop for different signal phenomena so as to assure recovery of synchronization information contained in input signals under conditions of noise, frequency jitter phase jitter, frequency offset and base line offset, as may be caused by drift in the direct current components of the input signals.

A synchronization system which functions as a bit synchronizer, say for PCM telemetry data signals, is basically a feedback control system having a control loop in which error signals are developed, as in response to transitions in the input data signal (by which is meant changes in the state of the data) in order to enable the loop to track the data. While synchronizers have been provided which perform automatic gain control and automatic offset or baseline (viz., d.c. drift) correction, there have been no means for adapting the loop as by controlling the loop band width to counteract the effect of noise or of frequency and phase jitter which may be contained in the input data signal. Accordingly, bandwidth of the control loop has had to be manually controlled according to an operator's best guess of the prevailing signalling conditions and their effects in interposing noise, and/or frequency and phase jitter on the incoming signals. Where the bandwidth of a loop filter has been varied, the measurements of the noise and/or jitter have not been independent of loop operating conditions, so that the loop has not been truly adaptive in accordance to the content of the noise or of the jitter in the input signal. Accordingly, rapid acquisition of synchronization, recovery of the synchronization and holding of lock has not been fully realized. Reference may be had to the following U.S. Pats. for further information respecting such known synchronizing systems; U.S. Pat. Nos. 2,453,988; 3,078,344; 3,195,059; 3,209,271; 3,286,188; 3,376,511; 3,557,308; 3,626,301; and 3,746,997.

Accordingly, it is an object of the present invention to provide an improved phase locked loop bit synchronizing system which adapts the bandwidth of its loop automatically in response to signalling conditions, such as noise and jitter, so as to acquire synchronization quickly in spite of such signalling conditions.

It is a more general object of the present invention to provide an improved bit synchronizer which facilitates the detection of data contained in input data by maintaining a low error rate in the detected data even when the input data is affected by noise, jitter or other error producing conditions.

It is another object of the present invention to provide an improved synchronization system which has rapid dynamic response so as to track the incoming data and remain in synchronism, even with increasing jitter and noise in the data.

It is still another object of the present invention to provide an improved synchronizing system which holds lock even in the presence of noise.

It is still another object of the present invention to provide an improved synchronizing system for data signals even when the data has low transition density.

It is a further general object of the present invention to provide an improved adaptive bit synchronizer which rapidly acquires synchronization and re-acquires synchronization as well as remains in synchronization with a data bit stream.

It is a still further object of the present invention to provide an improved bit synchronizer for acquisition and recovery of sync under varying conditions of noise, jitter, frequency offset and baseline offset of an incoming data signal.

It is a still further object of the present invention to provide an improved adaptive bit synchronizing system which reduces loss of data or increases in error rate due to adverse signalling conditions such as noise, jitter, frequency offset and baseline offset.

It is a still further object of the present invention to provide an improved bit synchronizer which is responsive to signalling conditions to adapt the bandwidth of a phase locked loop to counteract such conditions and thus reduce loss of data and introduction of errors.

It is a still further object of the present invention to provide an improved bit synchronizer which responds to changes in the phase and noise characteristics of incoming data signals to adapt the bandwidth of a phase locked loop so that it rapidly acquires synchronization with the data in the signals and reduces loss of data.

It is a still further object of the present invention to provide an improved bit synchronizer in which the need for manual control and adjustment is reduced.

It is a still further object of the present invention to provide an improved adaptive bit synchronizer in which sync need not be acquired first and before the synchronizer becomes capable of adapting to changes in the various parameters (e.g., noise, jitter, etc.), which can prevent acquisition and can cause loss of sync.

It is a still further object of the present invention to provide an improved bit synchronizer which adapts the parameters of its circuit elements which effects synchronization acquisition characteristics independently of each other.

Briefly described, the invention provides a synchronization system for synchronizing incoming signals having a periodic structure such as data signals having transitions which occur at intervals related to the period of such signals. The system includes a phase locked loop which generates output signals, usually called a local clock, which are in synchronism with the input signals. Means which are responsive to the input signals are are located ahead of the loop provide outputs corresponding to the noise to signal ratio of the input signals as well as outputs corresponding to the occurrence of the transitions. A matched filter having a response for signals which are orthogonal to the input signals provides these outputs. If, for example, the input signals are PCM data signals encoded in accordance with the NRZ code, the filter is matched to signals coded in accordance with the split phase code. For split phase coded input data signals the filter is matched to NRZ coded data signals; the NRZ coded signals being orthogonal to the split phase coded signals. The loop may also be provided with a detector for variations in the frequency of the output or local clock signals. A circuit which responds to the rate of change of the control signals generated by the phase detector in the loop provides the jitter responsive signals. These jitter signals are preferably error signals corresponding to the estimate of the rms frequency error of the output or local clock. The loop includes means for varying its bandwidth as by increasing the gain of the loop or by changing the bandwidth of a variable filter in the loop. The loop bandwidth is then adapted independently in accordance with the noise to signal ratio and the jitter so that the loop is adapted for adverse signalling conditions even if synchronization is not initially obtained. The matched filter may also provide outputs for controlling the amplitude as well as the d.c. offset (baseline drift) of the input signals which are applied to the matched filter. The matched filter also detects transitions and provides outputs to the phase detector and also to a frequency error detector, if desired, for locking the loop to the incoming data.

The foregoing and other objects and advantages of the present invention will become more readily apparent from a reading of the following description in connection with the accompanying drawings in which.

Figure 1:
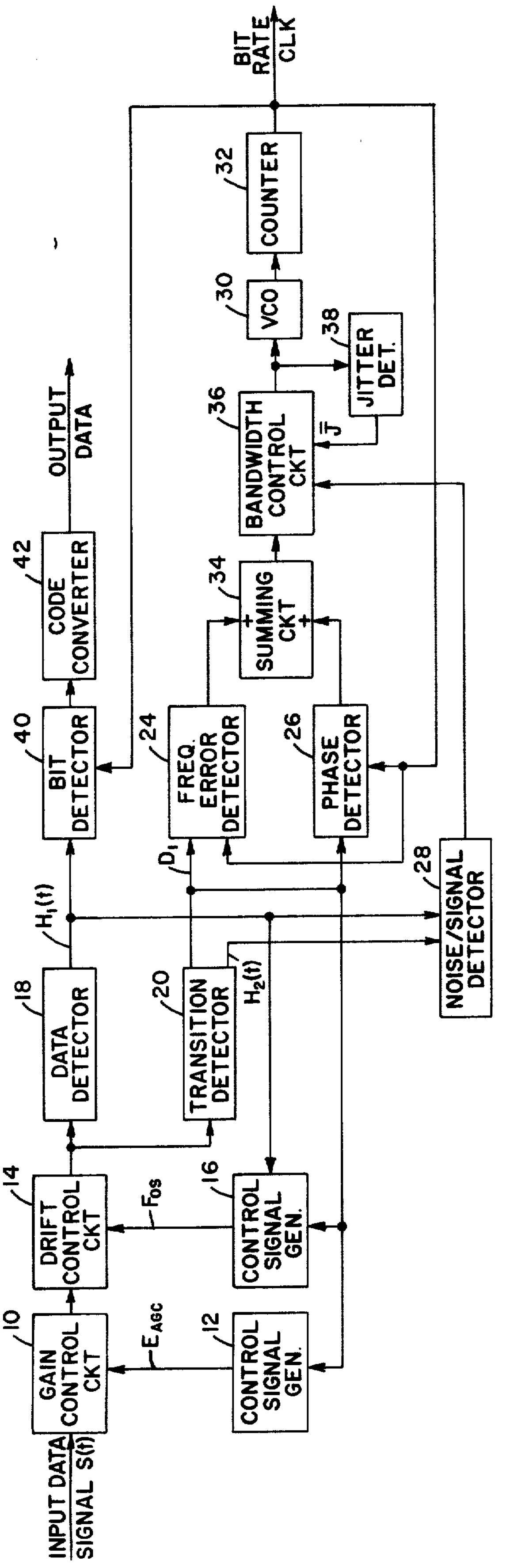
FIG. 1 is a block diagram of a bit synchronizer system embodying the invention.

Consideration of the theoretical basis of the present invention will illustrate how the invention resolved requirements which have been considered as conflicting. These requirements are the acquisition or re-acquisition of synchronization (lock) and the holding of lock under noisy conditions. Rapid acquisition and re-acquisition has been believed to require a relatively wide bandwidth in a phase locked loop synchronizer. Holding lock, under noisy conditions, on the other hand requires a narrow bandwidth.

Acquisition time for a phase locked loop is given by the relationship shown in Equation (1) in the Appendix, where T is the time to acquire lock, B is the loop bandwidth, and $\Delta f$ is initial frequency offset. There is therefore a cubic dependency on loop width for the acquisition or re-acquisition of lock. The mean time to lose lock is given by the relationship shown in Equation (2) in the Appendix.

Consider the following numerical examples: if the loop is set at a bandwidth of 0.1% of the bit rate and the initial frequency offset due to a noise burst or uncertainty in the source of the data signals was 1%, the acquisition or re-acquisition time would be approximately 400,000 bits. If the loop bandwidth were 3% of the bit rate, the acquisisiton time would only be 15 bits. On the other hand, if the input data signal had a signal to noise ratio of −10db, for the 0.1% bandwidth loop, the signal to noise as measured in the loop would be approximately 50 db and lock would be lost in a mean time of $10^{43}$ bit intervals. In other words, in this example lock would be held for the narrow loop setting. However, for the 3% bandwidth loop the signal to noise ratio in the loop is 15 db and the mean time to lose lock would be $6 \times 10^9$ bits. This calculation assumes a 3 db loss in signal to noise ratio conversion due to phase error measurement in the loop. For additional loss, say to 6db, the mean time to lose lock would be only $3 \times 10^5$ bits. Thus, there are several orders of magnitude difference in the lock-holding characteristics between the narrow band and the wide band loop in the presence of noise. Yet, if the loop were made narrow to counteract noise the acquisition time would be increased by several orders of magnitude. Sometimes it is more convenient to use the noise to signal ratio rather than the signal to noise ratio, both being equivalent (viz., S/N is merely the inverse of N/S).

These conflicting requirements can be overcome in accordance with the invention by measuring the input signal to noise ratio through the use of matched filters, as will be explained more fully hereinafter, and then varying the bandwidth of the loop so as to be proportional to the noise to signal ratio of the incoming signal and inversely proportional to the frequency jitter of the signal. The matched filters permit the noise to signal or signal to noise ratio to be measured independently or jitter and without the need for initial synchronization.

Consider the theory supporting the operation of the system in providing rapid acquisition or re-acquisition and holding lock in spite of noisy signalling conditions. It can be shown from statistical theory that loop width can be determined from independent measurements of phase and that the loop width can be varied by combining such independent measurements.

Assume that the accumulation of all the previous measurements of proper phase have associated with them a certain reliability. The present rms error in phase can be measured as well as the incoming signal to noise ratio. Therefore, one has an estimate of the rms error of the old measurements $\phi_1$, and the new measurements $\phi_2$. Furthermore, the experiments on measuring phase error are all presumed independent.

and the rms error in each measurement are respectively $\sigma_1$ and $\sigma_2$.

Suppose the old measurements say that the proper phase was $\phi_1$ and the new measurements say the proper phase is $\phi_2$. Suppose first that the experimental outcomes $\phi_1$ and $\phi_2$ are drawn from Gaussian distributions and we are looking for the most likely $\phi$. As shown in Equation (3) in the Appendix, the probability density that $\tilde{\Phi}$ is the correct phase, given the results of the experiments $\phi 1$, $\phi_2$, is the same as the probability of getting the experiments given $\tilde{\Phi}$, was the correct phase times the a priori probabilities $P_0\,\tilde{\Phi}$ divided by the fixed number $p_0\,(\phi_1, \phi_2)$. Since all phases are a priori equally likely, the problem reduces to finding $\phi$ which maximizes $p\,(\phi_1, \phi_2/\tilde{\Phi})$ which is expressed in Equation (4) in the Appendix. Equation (4) assumes the experiments are independent.

The $\tilde{\Phi}$ which minimizes the exponent in Equation (4) is found by taking the derivative and setting it equal to zero, obtaining Equation (5) in the Appendix. Equation (5) is obtained assuming Gaussianity to find the most likely phase.

It is possible to derive a similar linear estimate, as shown in Appendix Equation (6) without any knowledge of the density functions but just knowing their variances. The Equation (6) represents a weighted average of the experiments and finds the a which minimizes the rms error. That is E is minimized, as shown in Equation (7) where E $\{|\phi_1\ \phi_2)\}$ means the expected value over the restricted space (given the results of the experiments), as expressed in Equation (8).

Since the experiments are independent, Equation 8 simplifies to Equation (9). E is minimized for the a expressed as set forth in Equation (9a) in the Appendix.

Substituting in Equation (6) results once again in Equation (5) which shows the relative weighting of incoming data vs. stored data. (See Equation 9(b)).

The optimum bandwidth is a monotonic function of rms disturbance to incident noise ratio. Regard the input frequency as a random process and consider the noise disturbance as additive; then the optimum loop filter can be derived.

As a model consider the closed loop response which will minimize rms tracking error for a given input jitter and a given additive (independent noise).

The optimum filters transfer function is given by Equation (10) where $S_m(w)$ is the input power density spectrum of the jitter and $S_n(w)$ is the noise.

Now consider the case where the input jitter disturbance rolls off like a single time constant (see Equation (11)). The rms jitter in this case is proportional to $a$. For white noise $s_n(w) = K^2$ the resulting bandwidth for the optimum filter is proportional to $a/K$. For optimal realizable filter, even this simple case yields a fairly complex transfer function, however the same sort of dependency on rms jitter and rms noise applies.

The fact that the optimum filter is a function of the ratio of rms input jitter to rms noise holding the spectral shape of each constant is obvious from the original integral equation describing the optimal filter for tracking (see Equation (12), where $\phi_{11}\,(\tau)$ is the autocorrelation of the input jitter, and $\phi_{nn}(\tau)$ is the autocorrelation of the noise. If we increase the filter $\phi_{11}$ by a factor $k$ and the noise $\phi_{nn}$ by a factor $y$ then divide the resulting Equation (12) by $y$ then it is clear that the resulting optimum loop filter $h\,(\tau)$ will depend on the ratio $y/k$. In fact the larger the noise the narrower the filter should be, while the larger the jitter the wider the loop should be.

Referring now more particularly to FIG. 1, there is shown an adaptive bit synchronizer system utilizing a matched filter, not only for loop bandwidth control but also for controlling the amplitude and the d.c. offset of input data signals which are indicated generally in FIG. 1 as $S(t)$. The input data signal is applied to a gain control circuit 10 which may be a variable gain amplifier of the type which is controlled by a control voltage, referred to as an automatic gain control voltage; the gain control circuit being similar to the amplifiers used in radio systems for automatic gain control purposes. The control voltage indicated by the legend, $E_{AGC}$ is provided by a control signal generator 12.

The output of the gain control circuit may be subject to d.c. offset or shift in the baseline or average value of the input data signal. Inasmuch as many types of PCM telemetry codes, particularly the so-called NRZ, are baseline dependent it is desirable to correct for such d.c. offset. The drift control circuit 14 varies the offset as by inserting a baseline correction level indicated as $F_{OS}$ to the control circuit 14. The control circuit may be a clamping circuit of the type used in television systems. The variable offset signal $F_{OS}$ is generated by a control signal generator 16.

The control signal generators 12 and 16 may be part of data and transition detectors 18 and 20. The data and transition detectors 18 and 20 may be provided by a matched filter or filters which provide waveforms from which the gain and offset control voltages $E_{AGC}$ and $F_{OS}$ can be derived. The transition detector 20 provides two outputs, a first output indicated as $D_1$ upon occurrence of a transition or change in data state (viz., a signal level crossing a threshold), and another output indicated as $H_2(t)$ which is determined by the response of the transition detector matched filter network which is matched to a signal orthogonal to the input data signal. The data detector 18 may include a matched filter network which does have a response matched to the input data signal. The output of the data detector matched filter network is indicated as $H_1(t)$. The output $D_1$ corresponding to the transition is used to control a phase locked loop 22 by being applied to the loop control error voltage generators which are indicated as a frequency error detector 24 and a phase detector 26. The matched filter network outputs $H_1(t)$ and $H_2(t)$ are used in determining the noise to signal ratio of the input data signal and are applied to a noise to signal detector 28. The noise to signal ratio is the inverse of the signal to noise ratio of the input data signal.

The phase locked loop 22 has, as its loop elements, an oscillator whose phase and frequency is variable by the loop control voltage and which is indicated as being a voltage controlled oscillator 30, referred to hereinafter as a VCO. The VCO 30 provides the output signal which is synchronous with the input data. This signal is divided in a counter 32 so as to have the same rate as the input data. The loop output signal is therefore referred to as a local or bit rate clock. The phase detector 26 has the loop output signal applied thereto for comparison therein with the transition output signals $D_1$ from the transition detector 20. The phase detector delivers a control voltage which is a function of the difference in phase between these signals; while the frequency error detector 24 provides an output corresponding to the rate in change frequency of the transition detector output $D_t$. In order to break false lock and improve upon the classical U-shape acquisition curves of ordinary phase locked loops, the frequency error, preferably is measured directly by means of digital logic which determines if the bit rate clock is occurring faster or slower than the input data signal rate as represented by the transition signals $D_t$. A frequency error detector arrangement which provides such direct comparison is illustrated hereinafter in connection with FIGS. 10 and 11.

The phase locked loop 22 includes a summing circuit 34 which adds the frequency error and phase error signals from the detectors 24 and 26. The summing circuit provides the loop control voltage to a loop bandwidth control circuit 36. It is this bandwidth control circuit 36 which responds to the noise to signal detector 28 and to a jitter or rms frequency error in the loop output signal generated by a jitter detector 38. This jitter signal which is preferably the rms frequency error or jitter in the output signal is indicated as J and is applied in an inverse sense of $\bar{J}$ to the bandwidth control circuit 36 which operates to decrease the bandwidth with increasing error or control signal amplitude and increase the bandwidth with decreasing error or control signal amplitude. Accordingly, as the noise to signal ratio as measured by the noise signal detector 28 from the matched filter outputs increases, the bandwidth of the loop decreases. However, for increasing jitter the loop bandwidth is increased. The jitter is measured at the output of the bandwidth control circuit, i.e., the control signal which varies the frequency and phase of the output signal contains the rms frequency error and is detected in the jitter detector to provide the jitter signal J.

The bit rate clock is applied to a bit detector 40 together with the output of the data matched filter $H_1(t)$ and makes a bit decision. The sequence of detected bits (viz., 1's and 0's) determines the character in accordance with the code in which the data is encoded. The bit sequences are therefore applied to a code converter 42 which translates the bit sequence into output data corresponding to the data carried by the input data signal.

It can be shown that a matched filter having a response orthogonal to the input data signal provides an output which is a measure of the proper sync points as well as of the signal to noise ratio of the input data signal. A matched filter which is matched to the data signal can be used to provide an output which is a measure of the d.c. offset of the data signal. The data matched filter also conditions the data signal so as to facilitate bit detection therefrom.

Consider that the sync points are an event which may be called $f(t)$, the time of occurrence of which is to be determined. Assume a white noise background. Then the matched filter should maximize the derivative to noise ratio at the periodicity of the data signal (viz., at times $t = \tau$). By applying a calculus of variations technique for the time reversed impulse response of the matched filter Equation (13) results, where $\tau_1$ and $\tau_2$ are Lagrangian multipliers. When this Equation (13) is maximized the solution is as per Equation (14), where the relative values of $C_1$ and $C_2$ are determined by the cost of false crossings. Where false crossings dominate, as is the usual problem, Equation (14) reduces to the classical matched filter response equation set forth in Appendix Equation (15).

Filters which have responses defined in accordance with Equation (15) will have outputs which are maximized upon transitions where zero crossings in input signals which are orthogonal to the filter response. In other words an input signal which is applied to a matched filter having a response orthogonal to the input signal will produce peak or maximum outputs at the zero crossings or transition points of the input signal. These outputs thus correspond to the sync points of an input data signal and can be used as inputs to the phase detector of phase locked loop as is indicated in FIG. 1.

By way of specific example consider the cases when data signals are represented by the NRZ and split phase PCM codes. The matched filter for NRZ has the transfer function of Equation (16). The matched filter for split phase codes has response given by Equation (17).

These responses can be written in the form more suitable for reactance function approximation of hyperbolic functions set forth in Equations (18) and (19). We now can approximate the cotangent (see Equation (20a)), and the numerator in Equation (19), as shown in Equation (20(b)) in a pole-residue expansion with end point correction.

Reference may be had to the following articles for further information respecting these mathematical operations. Halpern, "Trigonometric Pulse Forming Netowrks Revised", IEEE Transactions on Circuit Theroy, January, 1972, pages 81 to 86; and Lerner, "Bandpass Filters with Linear Phase", Proceedings of the IEEE, March 1964, pages 249 to 268. The expansion results in Equations (21) and (22) as shown in the Appendix. $C_1$ and $C_2$ are selected to correct the approximation at $\tau S = \pi$, where $j$ is $\sqrt{-1}$. Note that both Equations (18) and (19) have the same denominator and thus both the NRZ and split phase impulses responses can be realized with the same matched filter. Equations (21) and (22) for two pole versions of the matched filter become the relationships shown in Equation (23) and (24) respectively. For the three pole matched filter Equation (21) becomes Equation (25).

Figure 4:
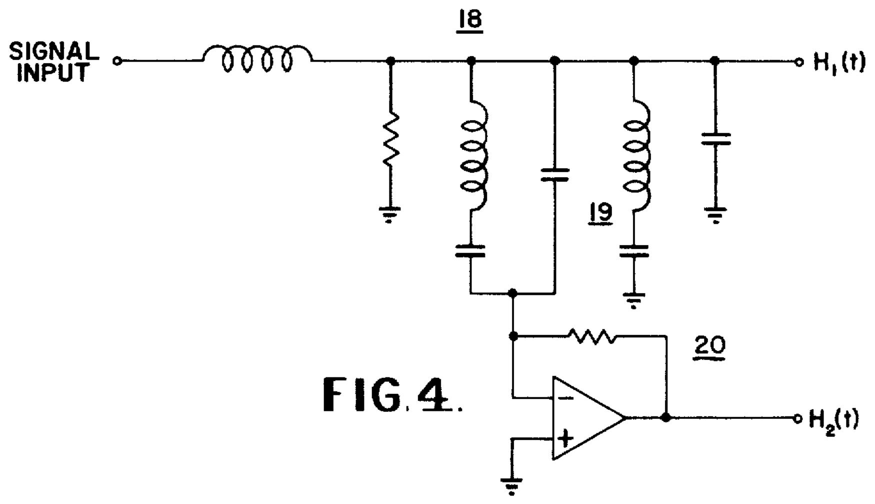
FIG. 4 is a schematic diagram of a matched filter which may be used in the system shown in FIGS. 1 and 2.

FIG. 4 illustrates the three pole case. Equivalent circuitry involving active resistor capacitor elements or digital configurations of these matched filters using sample data techniques may also be used. The values of the reactance elements shown in FIG. 4 may be obtained from Equation (25) using standard network synthesis techniques, the Foster expansion being suitable. Reference may be had to the article by Halpern entitled "Single Amplifier Active RC Synthesis" which appeared in the IEEE Transactions on Circuit Theory, February, 1969, pages 102, for further information respecting the techniques for obtaining the circuit values of the preactance components of the matched filters.

The above cases involving NRZ and split phase codes are only examplary. Other codes in which data signals may be transmitted, say in several bits per baud or signalling interval may also be used. Reference may be had to the text "Signal Theory" by L. E. Franks, published by Prentice-Hall in 1969, for further information respecting such multiple bit codes. The design of matched filters for use as data and transition detectors in systems provided in accordance with the invention may be determined as follows: Consider that the signal in each baud or signalling interval is composed of a linear sum of finite sine pulses which may be represented by Equation (26). The possible $n$ tuples $(a_1, a_2, \cdots a_n)$ determine the alphabet. If each of M possible $n$ tuples is equally likely to be transmitted then $\log_2 M$ is the number of bits per baud. The matched filters for distinguishing these signals have similar expansions.

Now a synchronizer matched filter set can be designed to detect a change in any coefficient $a_k$ from baud to baud. Just as the case for NRZ and S$\phi$ the synchronization filters are orthogonal to the data signals.

The synchronizing filters will be restricted to be of the form expressed in Equation (27). The filters of Equation (27) are flat orthogonal to the signals of Equation (26); that is, they will always have flat zero outputs at the end of each baud. Furthermore, they have notches at the frequencies in (26) so there must be a change of the $a_k$ before there is any output from a filter of the form of Equation (27).

In order to design a filter of the form of Equation (27) matched to detect a change in $a_k$ and constrained to be orthogonal to changes in the orthogonal to changes in the other $a$'s maximize the function of Equation (28). Under the constraints for $\{i:i \leq n, i \neq k\}$ Equation (29) results and $\Sigma b_j^2 = K$. Because the even (odd) harmonics are orthogonal to the odd (even) harmonics over the half interval, the expression shown in Equation (30) for the coefficients $b_j$ of the matched filters results for $j$ odd, $i$ and $k$ even or for $j$ even, $i$ and $k$ odd; otherwise, $b_j = 0$ for $k$ and $j$ even or $k$ and $j$ odd.

To compute the Lagrangian multipliers $\lambda_i$ for $i$ odd, multiply Equation (30) by $h/j^2 - h^2$ and sum over all even $j$ to obtain Equation (31) for every $h$ odd and $\leq n$ and for $j$ even and $m \geq j \geq n+1$. That Equation (31) sums to zero follows from constraints, noted in Equation (29). A similar set of linear equations exists for $\lambda_i$ even.

Equation (31) may be converted into the reactance elements of a suitable matched filter by techniques similar to those mentioned above in connection with Equation (25). Accordingly matched filters may be derived which serve to determine the proper sync point for various types of data systems. The matched filter outputs can also be used to obtain control voltages for controlling the amplitude and d.c. offset of the input data signals.

Figure 3:
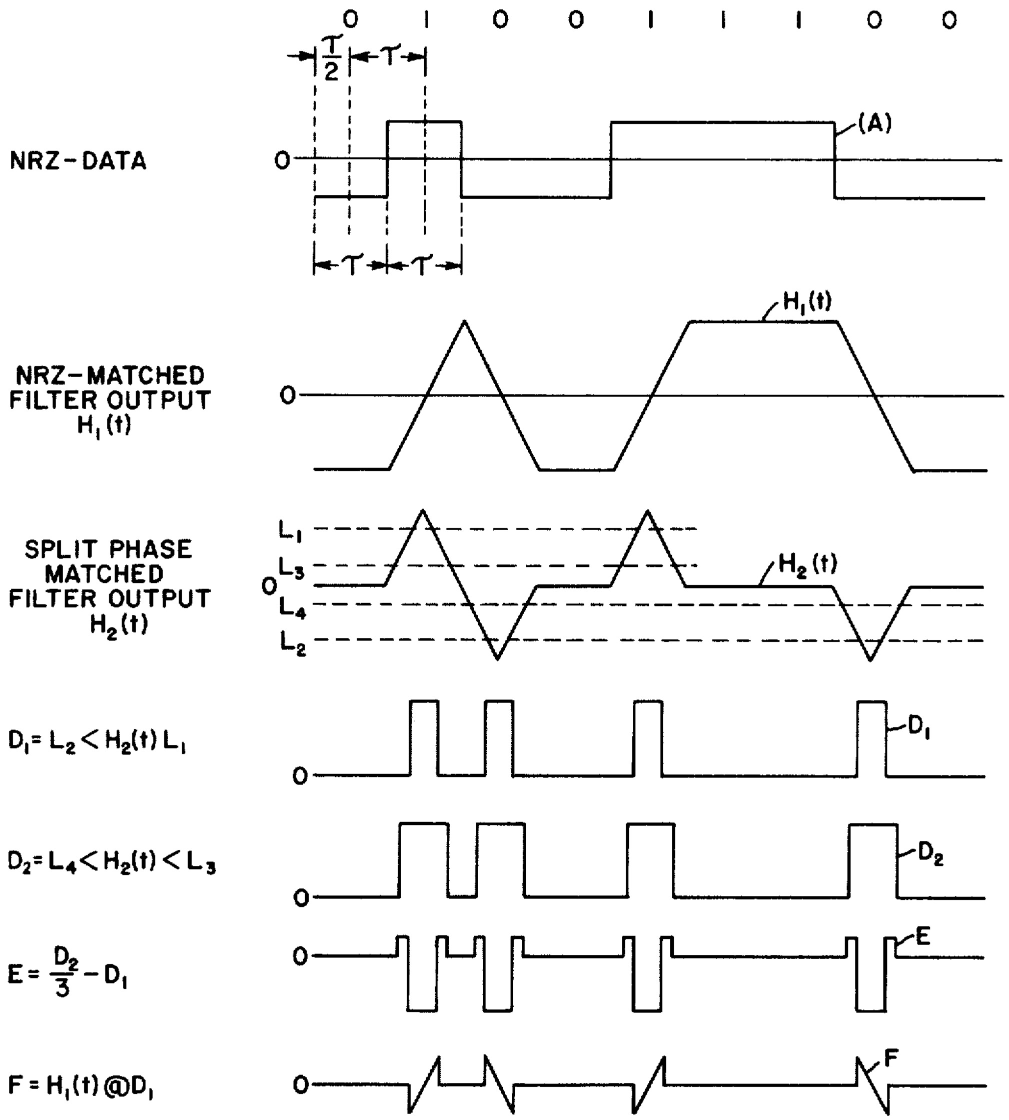
FIG. 3 are idealized waveforms illustrating the operation of the system shown in FIGS. 1 and 2.
Figure 5:
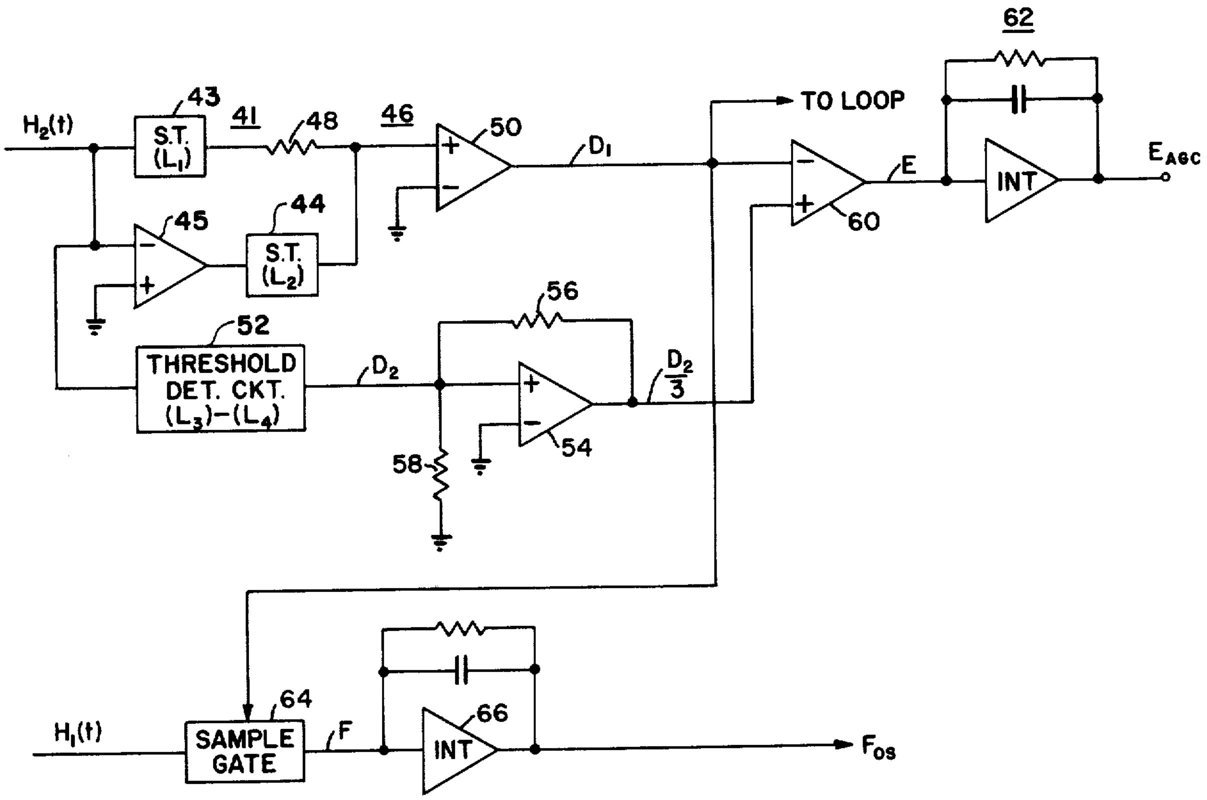
FIG. 5 is a block diagram of the pulse and control signal generators which may be used in the system shown in FIGS. 1 and 2.

FIG. 5 illustrates a system whereby the transition signals $D_1$ for locking the loop 22 as well as the gain and offset control voltages $E_{AGC}$ and $F_{OS}$ can be obtained for the exemplary case where the input signal data is coded in accordance with the NRZ PCM telemetry code. Waveform (A) in FIG. 3 illustrates a NRZ coded data signal for a typical bit stream consisting of the successive bits 0 1 0 0 1 1 1 0. The data signal is periodic, being indicated as $\tau$. the center of each bit cell is shifted one-half period or $\tau/2$. The change of data state or transitions occur at the edges of the bit cell. The transitions have periodicity which are a function of the data or bit symbol periods or signalling intervals. Consider that if the data were coded in accordance with the split phase code, such that the data signals were orthogonal to the NRZ data signals, the transition events would occur exactly at the center of the bit cell. The basic baud or symbol period $\tau$ would be the same as in the NRZ case but shifted one-half of the symbol period. Thus, if the data is NRZ as shown, the transition events can be considered to be split phase pulses. Conversely, if the data were split phase, the transition events are levels which are non-return to zero for $\tau$ seconds.

As explained in the above theoretical discussion of matched filter operation, a matched filter network for the orthogonal or split phase data signals can be used to detect the transition in NRZ data signals, while NRZ matched filters can detect transitions in split phase data signals.

FIG. 3 shows in waveform $H_1(t)$ the output of the NRZ matched filter for the NRZ data signals shown in waveform A. The waveform labeled $H_2(t)$ shows the split phase matched filter output for the NRZ data signal of waveform (A). The triangular $H_1(t)$ output is obtained from the data detector matched filter networkk 18 (see also FIG. 4) and has cross-overs at the center of the bit cells of the bit where the data changes. The triangular $H_2(t)$ filter outputs obtained from the other matched filter network (see also FIG. 4) 20 has peaks or maxima at the center of these bit cells. Circuits as shown in FIG. 5, which are responsive to signals of greater amplitude than threshold levels, indicated by way of example as levels $L_1$ to $L_4$ in the waveform for the $H_2(t)$ output can be used for deriving the gain and d.c. offset control signal as well as for obtaining the signals $D_1$ which are used for synchronization purposes in the phase locked loop 22.

In order to derive the transition signal $D_1$ the output $H_2(t)$ is applied to a Schmidt trigger circuit 43 which has its threshold set at $L_1$ and to an inverting amplifier 45. The output of the inverting amplifier 45 operates another Schmidt trigger 44 which is set at the $L_2$ level. The Schmidt triggers 40 and 44 thus provide pulses whenever the $H_2(t)$ output is above level $L_1$ or above level $L_2$. These output pulses are added together in a summing circuit 46 provided by a resistor 48 and amplifier 50. The output $D_1$ is shown in FIG. 3 and can be applied to the frequency in phase detector 24 and 26 of the phase locked loop 22, for synchronization purposes.

In order to provide the gain control voltage $E_{AGC}$ another threshold detector circuit 52 containing a Schmidt trigger set to the $L_3$ threshold, an inverting amplifier and Schmidt trigger set to the $L_4$ threshold and a summing circuit which combines these outputs similar to the threshold detector circuit 41 used to provide the $D_1$ pulses, may be used. This threshold circuit provides the $D_2$ pulses whenever $H_2(t)$ is greater than the $L_4$ threshold and less than the $L_3$ threshold. These $D_2$ pulses are shown in FIG.. 3.

An amplifier 54 which may be an operational amplifier having feedback resistors 56 and 58 connected to its direct input for purposes of lowering the gain of the amplifier to be approximately one-third, provides an output indicated as $D_2/3$. Other attenuators such as resistor networks may be used to provide the $D_2/3$ output. The $D_1$ and $D_2/3$ outputs are subtracted as in an operational or difference amplifier 60 to provide an output voltage E equal to the difference between the $D_2/3$ voltage and the $D_1$ voltage. This output is also illustrated in FIG. 3. It will be appreciated that the $D_1$ pulses will be subject to greater width modulation with changes in the amplitude of the data signal as the $D_2$ pulses. When the $D_1$ pulses are approximately equal to one third of the wider $D_2$ pulses the input data signals can be assumed to have normal amplitude. Accordingly, when the average value of the E waveform is zero, the input data signals may be deemed to have the proper and desired amplitude. Accordingly, the E signals are applied to an integrator network 62, which may be an operational amplifier having an integrating circuit in its feedback path, so as to obtain the gain control voltage $E_{AGC}$. This voltage is applied to AGC an amplifier in the gain control circuit 10 so as to provide the input signals with proper gain.

The d.c. offset control voltage $F_{OS}$ may be obtained from the NRZ matched filter output $H_1(t)$ and the transition pulses $D_1$. Inasmuch as the $H_1(t)$ output should have a cross-over (cross zero voltage level) during the transition time, a d.c. offset in the data signal will vary the cross-over point. Accordingly, by sampling the $H_1(t)$ output in a sample gate circuit 64 operated by the $D_1$ transition pulse, an output F as shown in FIG. 3 will be obtained having a d.c. or average value which is proportional to the offset. When this signal F is integrated as in an integrator circuit 66, which may be provided by an operational amplifier with a RC feedback circuit, the d.c. value of the waveform F is obtained and provided to the drift control circuit 14 (FIG. 1) as the signal $F_{OS}$. The drift control circuit may be a clamping circuit of the type used in television pulse circuit having a variable clamping level provided by the $F_{OS}$ signal.

Figure 6:
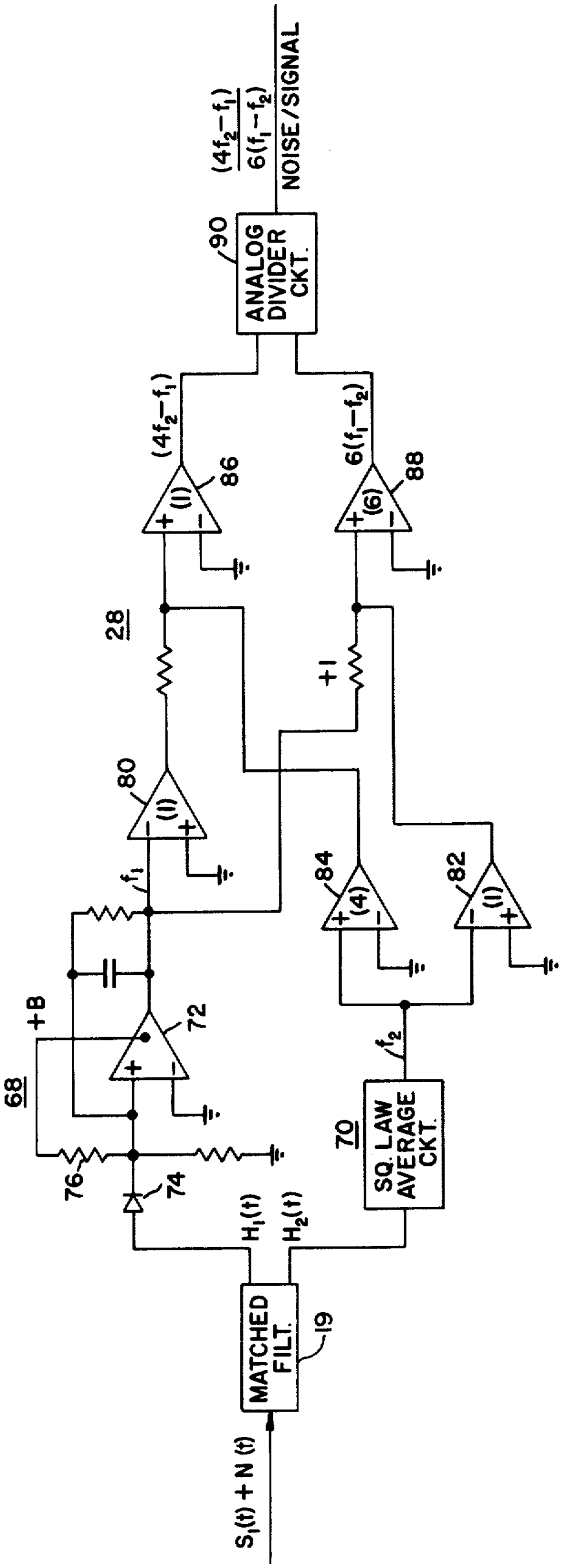
FIG. 6 is a block diagram of the noise to signal ratio detector which may be used in the system shown in FIG. 1.

The signal to noise or noise to signal ratio is measured independently of the jitter and without any requirement that the loop 22 be locked or in sync, by means of the noise to signal ratio detector 28 which is shown in greater detail in FIG. 6. The input signal which may be expressed as $S_1(t) + N(t)$ including the signal component $S_1$ and the noise component N are applied to the matched filter 19 (FIG. 4) which serves as the data and transition detectors 18 and 20. The matched filter network output $H_1(t)$ and $H_2(t)$ are applied to square law average circuits 68 and 70. These circuits are similar and the circuit 68 is shown in detail. This circuit contains an operational amplifier 72 having an RC integrating network in its feedback path. A diode 74 which is operated in the square law portion of its characteristics by a resistor biasing circuit 76 applies to the direct input of the operational amplifier 72 a signal which is a square law function of the $H_1(t)$ matched filter output. The integration network in the amplifier 72 provides the average value of this square law function of $H_1(t)$. The output of this square law average circuit is indicated as $f_1$. The other square law average circuit operates on the $H_2(t)$ input and provides the square law average output $f_2$. Consider that the output $f_1$ can be written as per Equation (32) where the bar indicates averaging over $t$, which is long relative to the signalling interval and is relatively short as compared to the effective frequency of the noise signal (viz., to the bandwidth of the noise environment change because of the time constant of the RC feedback circuit in the amplifier 72. In order to understand the operation of the noise to signal detector circuitry 28, consider that the noise is white noise and that the input signal $S_1(t)$ is equal to $S_0h_1(t)$., where $h_1$ is a normalized impulse response. The previous Equation (32) simplifies to Equation (33), where $\eta$ is the noise density and $R_{11}$ is the auto correlation function of a normalized input.

Similarly, the output of the square law average circuit 70 can be written as set forth in Equation (34). In the exemplary case of NRZ data signals which are processed in NRZ and split phase matched filter networks in the matched filter 19, the auto correlation function $R_{11}$ and $R_{22}$ may be written as set forth in Equations (35) and (36). When the outputs $f_1$ and $f_2$ are normalized for a symbol or signalling interval duration of $\tau$ to unity, these outputs may be written as set forth in Equation (37).

It therefore will be apparent that the noise to signal ratio is provided by the combinations of the square law average circuit outputs $f_1$ and $f_2$ as per Equation (38). This relationship as shown in Equation (38) may be implemented by the unity gain amplifiers 80 and 82, an amplifier 84 which has a gain of four, and by summing circuits 86 and 88. The summing circuits 86 and 88 contain unity gain and gain of six amplifiers and resistor input circuits. The outputs of the summing circuits 86 and 88 are applied to an analog multiplier divider circuit 90 which may be an integrated circuit device which is commercially available from Analog Devices, Inc., of Norwood, Mass., Part No. AD 531. Where the signal corresponding to $4f_1 - f_2$ is applied to the dividend input of the circuit 90 and the output corresponding to $6(f_1 - f_2)$ are applied to the divisor input of the circuit 90, the output is an error signal corresponding to the noise to signal ratio of the input data signals. This error signal is applied to the bandwidth control circuit 36 (FIG. 1).

Figure 8:
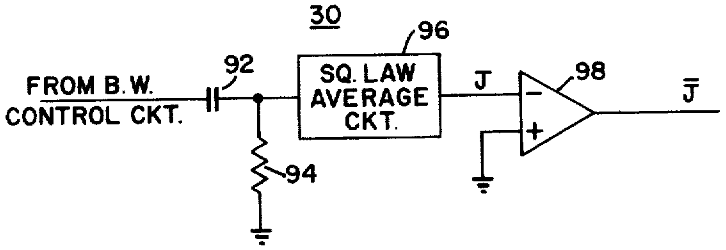
FIG. 8 is a block diagram illustrating a frequency jitter detector which may be used in the system shown in FIGS. 1 and 2.

The jitter detector circuit 38 as shown in FIG. 8 provided a measure of the rms frequency error of the output of bit rate clock from the loop 22. In order to avoid consideration of the d.c. frequency offset as an error the input error signals to the voltage control oscillator are AC coupled as by a capacitor 92 and resistor 94 which effectively differentiates the VCO input error signal. This signal is applied to a square law average circuit 96 similar to the circuit 68 (FIG. 6) and provides an output which is proportional to the jitter or rms frequency error of the local clock. This output is indicated as J and is inverted in an amplifier 98 to provide the output $\bar{J}$. Accordingly when the jitter increases the output $\bar{J}$ will decrease.

Figure 9:
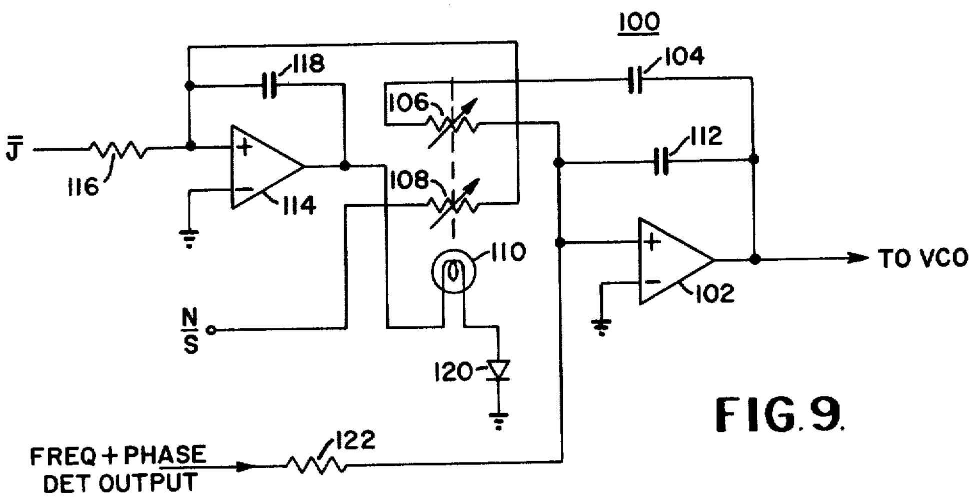
FIG. 9 is a schematic diagram illustrating a bandwidth control circuit which may be used in the system shown in FIGS. 1 and 2.
Figure 10:
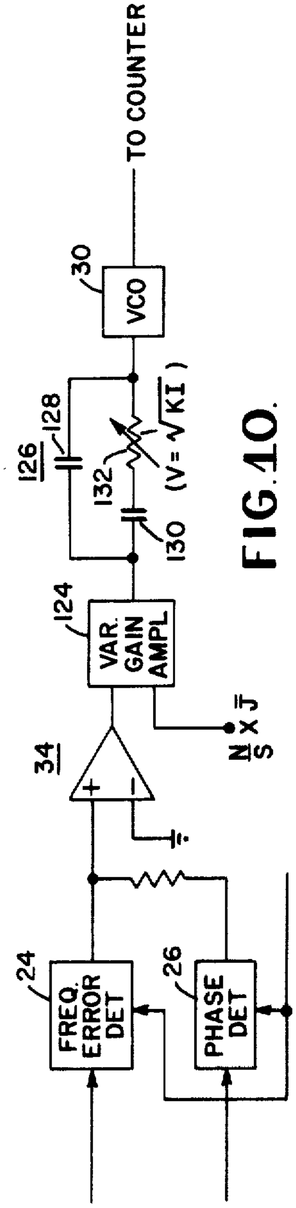
FIG. 10 is a block diagram illustrating another embodiment of the bandwidth control circuit which may be used in the system shown in FIGS. 1 and 2.

The bandwidth control is obtained by applying the product of the N/S and $\bar{J}$ signals to the bandwidth control circuit 36. Two bandwidth control arrangements suitable for use as the bandwidth control circuit 36 are illustrated in FIGS. 9 and 10. In FIG. 9 bandwidth control is obtained by an active filter network 100 consisting of an operational amplifier 102 having a feedback network consisting of a capacitor 104 and a light-dependent variable resistor 106. This resistor 106, another similar light-dependent resistor 108 and a light source 110, indicated as bulb, may be part of an optical control circuit of the type sold by the Raytheon Corporation of Lexington, Mass., under their trademark "Raysistor". Another capacitor 112 is also contained in the feedback path of the amplifier 102. The product of the $\bar{J}$ and N/S error voltages is obtained by applying the N/S voltage through the Raysistor 108 to the direct input of an operational amplifier 114 to which the $\bar{J}$ input is applied via an input resistor 116. The amplifier 114 also serves an an integrator by connecting a feedback capacitor 118 between the output and direct input thereof. Accordingly, any transients in the jitter will be damped out. A diode 120 is connected in series with the filament of the lamp 110 to the output of the amplifier 114. The sum of the frequency and phase detector error voltages as obtained from the summing circuit 34 is applied via an input resistor 122 to the input of the active filter 100.

As the $\bar{J}$ increases in amplitude the current to the lamp will also increase thus reducing the resistance of the light dependent resistor 108 and increasing the contribution of the N/S input. The non-linear characteristics of the resistor 108 provides for an effective multiplication of the $\bar{J}$ input with the N/S input. Both, thus, affect the current through the lamp filament and thus the resistance of the resitor 106 in the active filter 100. The resistance 106 is made proportional to the noise to signal ratio and inversely proportional to the jitter or rms error. In order to set up or calibrate the control circuitry shown in FIG. 9 the bandwidth of the filter 100 is centered about the oscillator 30 frequency which will produce a bit rate clock in synchronism with the input data bit rate when the ratio of the control voltage due to the noise to signal to the control voltage due to the jitter is equal to the resistance of the resistor 108 to the resistance of the input resistor 116.

The bandwidth of the loop 22 may also be controlled by changing the loop gain. As illustrated in FIG. 10, the frequency error detector 24 and the phase detector 26 have their outputs summed in a summing circuit 34 which may be provided by a unity gain operational amplifier having a summing resistor connected to its direct input. The summing circuit output is applied to the input of a variable gain amplifier 124 to which a signal which is the product of the noise over signal ratio N/S and the jitter $\bar{J}$ are applied as a gain control voltage. This product input may be obtained from the analog divider circuit 90 when a multiplier input thereof is used. The circuit then multiplies the quotient N/S by $\bar{J}$. The above-identified commercially available integrated circuit provides both the dividing and multiplication function. In order to keep the damping time constant of the loop fixed regardless of the gain of the loop, a damping circuit 126 is provided. This circuit includes a capacitor 128 shunted by another capacitor 130 and a non-linear resistor 132. This resistor 132 has a response characteristic which is proportional to the square root of the current therethrough. The output of the damping circuit 126 is applied to the voltage controlled oscillator 30 of the loop. Accordingly, by increasing the gain of the loop or decreasing the gain thereof, the bandwidth of the loop can be effectively changed to correspond to the noise to signal and jitter characteristics of the input data signal; thus adapting the loop for rapid acquisition and re-acquisition of lock as well as the holding of lock.

Figure 11:
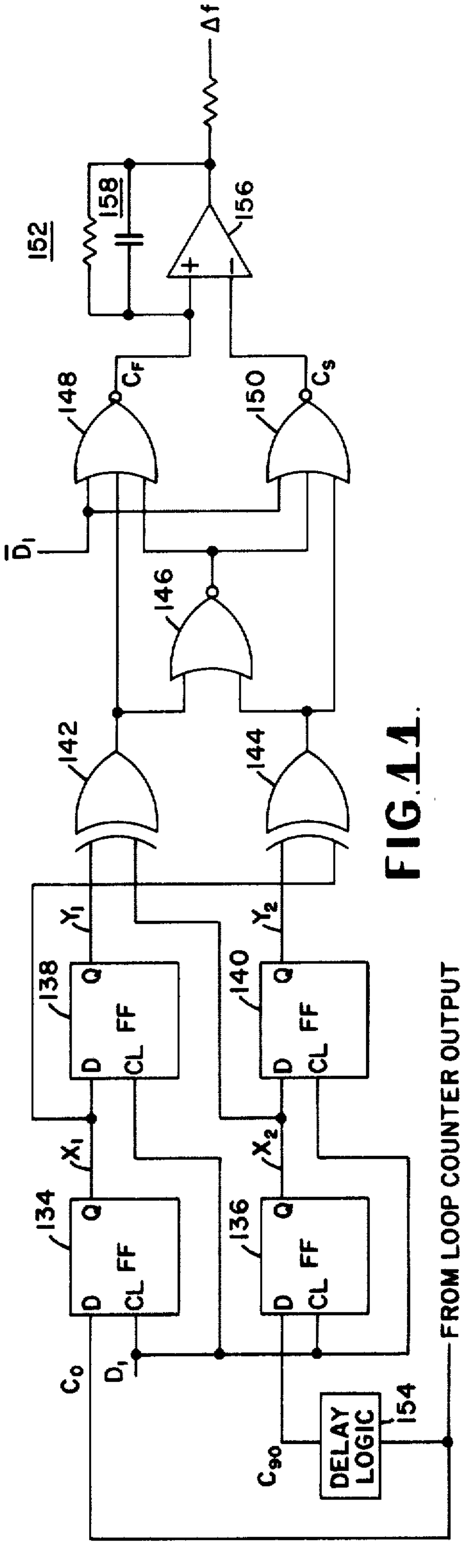
FIG. 11 is a block diagram illustrating a frequency error detector which may be used in the system shown in FIGS. 1 and 2.
Figure 12:
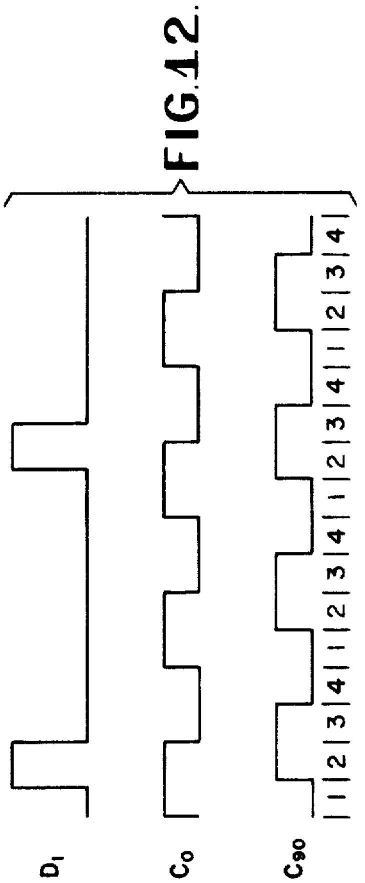
FIG. 12 are idealized waveforms which are illustrative of the operation of the frequency detector system shown in FIG. 11; and an Appendix to this specification sets forth equations which are discussed and described in the following description.

Although the phase detector 26 may have a high dynamic response in order to tolerate and provide control signals for tracking large excursions of phase, it is preferable to utilize a separate frequency error detector 24. This detector assists in breaking false lock and improves upon the classical U-shape acquisition curves of phase locked loops which are not equipped with such frequency detectors. The frequency detector 24 measures frequency error directly and provides a separate input to the phase locked loop. A suitable frequency error detector which may be implemented with digital logic is shown in FIG. 11. It consists of four D-type flip-flops 134, 136, 138 and 140, exclusive OR gates 142 and 144, NOR gates 146, 148 and 150, and an integrating circuit 152 which provides the output error signals $\Delta f$. The transition pulse $D_1$ is used to clock the flip-flops 134, 136, 138 and 140. A delay logic circuit 154 which may use additional dividers and gates connected to the output of the loop counters 32, provides two clocks $C_0$ and $C_{90}$ which are 90° or one-fourth delayed with respect to each other. The $C_0$ clock may be the bit rate clock. The two clocks thus define four time zones. The transition pulses, the clock, and the time zones are shown in FIG. 12. The leading edge of the transition pulse $D_1$ will occur in one of these time zones. If the number of the next time zone in which the leading edge of the following transition pulse occurs has increased, the clock $C_0$ is fast; it it has decreased, the clock $C_0$ is slow. Accordingly, a frequency error range of approximately 25% may be detected. The output gates 148 and 150 will then produce pulses $C_F$ if the clock is fast and $C_S$ if it is slow. The average value of the difference between the $C_F$ and $C_S$ waveforms is then a measure of the frequency error $\Delta f$. The integrator 152 includes a difference amplifier 156, an integrating circuit 158 which obtains this average value and provides it at the detector output.

When a $D_1$ pulse occurs, the state of the $C_0$ and $C_{90}$ clocks is shifted into the flip-flops 134 and 136 and stored therein as $X_1$ and $X_2$. These logic levels $X_1$ and $X_2$ appearing at the Q outputs of the flip-flops 134 and 136. The previously sampled states are shifted by the next $D_1$ pulses into the flip-flops 138 and 140 where they are stored at the Q outputs thereof as $Y_1$ and $Y_2$. The exclusive OR gates 142 and 144 as well as the NOR gates 146, 148 and 150 will provide outputs at each $D_1$ time by implementing the following combinational logic functions, which where the clock $C_0$ is fast is as set forth in Equation (39), and when the clock $C_0$ is slow is as set forth in Equation (40).

The exclusive OR gate simplify these equations as to the equations set forth as Equation (41) and (42) in the Appendix. Accordingly, the digital logic circuitry shown in FIG. 10 will provide the frequency eror signal $\Delta f$.

Figure 2:
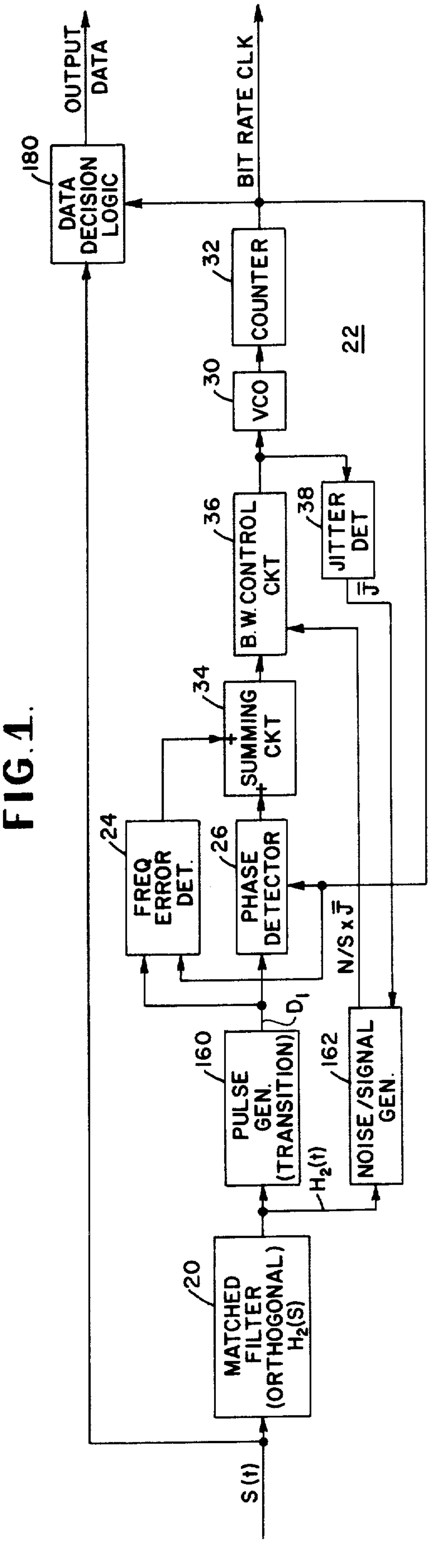
FIG. 2 is a block diagram of a bit synchronizer system in accordance with another embodiment of the invention.
Figure 7:
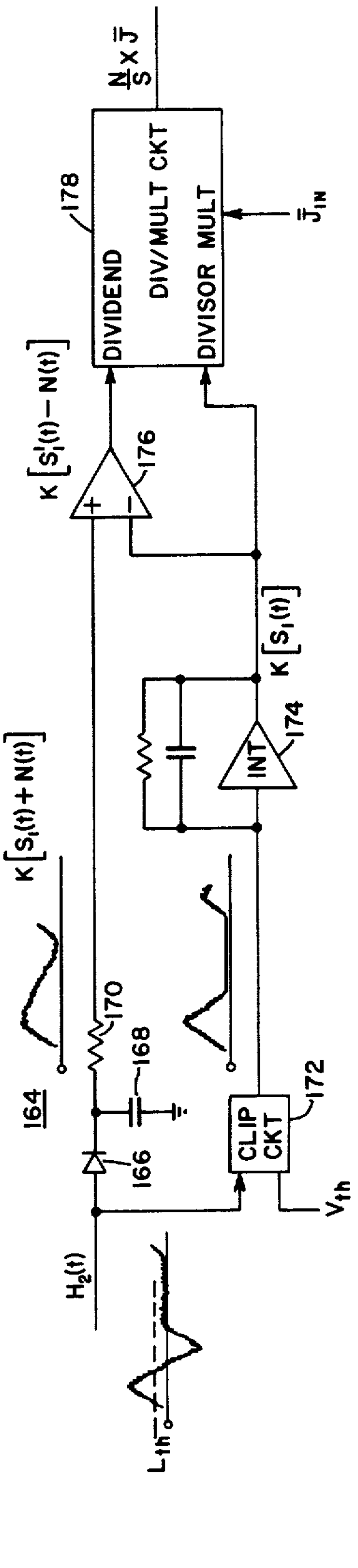
FIG. 7 is a block diagram illustrating the noise to signal ratio generator which may be used in the system shown in FIG. 2.

FIG. 2 illustrates a synchronizing system which is operative to provide the local bit rate clock without the need for a data matched filter. Only a filter which is matched to signal orthogonal to the input data signal, viz., a transition matched filter 20, is used. Thus if the input data signal is NRZ coded then the matched filter is matched to split phase data signals having the same bit rate. For other PCM codes including large bandwidth product codes the filters will be designed to match signals orthogonal to data signals which are coded or modulated in accordance with such codes. The design characteristics for such orthogonal filters have been discussed above. The output of the matched filter 20 is applied to a pulse generator 160 which may be a threshold detector circuit similar to the circuit 41 (FIG. 5) for providing the transition pulses $D_1$ (see FIG. 3). The output of the matched filter 20 is also applied to a noise to signal ratio detector 162. This detector may, for example, be of the type shown in FIG. 7. The $H_2(t)$ matched filter output which may have a waveform similar to that shown adjacent the input in FIG. 7 is applied to a detector circuit 164. This circuit is essentially an envelope detector and consists of a half-wave rectifying detector diode 166 and a smoothing filter including a capacitor 168 and resistor 170. The detector output will then be a function of both the signal $S_1$ $N(t)$, and may be expressed as $K[S_1(t)+N(t)]$.

The $H_2(t)$ matched filter output is also applied to a clipping circuit 172 having a clipping theshold voltage $V_{th}$. A clipping threshold $L_{th}$ shown in the waveform adjacent the input to the circuit is thus established such that the output of the clipping circuit will contain only the portions of the matched filter output above the threshold, as shown in the waveform adjacent the output of the clipping circuit.

Inasmuch as these higher amplitude portions of the matched filter output contain significantly more signals than noise components, the integral of the clipping circuit output waveform as obtained by an integrating circuit 174 is a function principally of the signal level $S_1(t)$. The integrator 174 may be an operational amplifier with an integrating circuit in its feedback path. While there will be some noise contained in the integrated output it will be essentially signal and may be expressed as $K[S_1(t)]$. The detector 164 output and the integrating circuit 174 output are applied to a difference amplifier 176 which effectively subtracts and removes the signal component leaving a small signal component $S'_1(t)$ and substantially all of the noise component. This small signal component may be neglected as may be the small noise component in the output of the integrator 174. Accordingly, the noise component may be applied as a dividend input and the signal component as a divisor input to a divider/multiplier circuit 178. This circuit may be of the same type as used in the analog divider 90 (FIG. 6). The $\bar{J}$ jitter signal may be applied as a multiplier input to the circuit 178. The output of the noise to signal generator 162 may as shown in FIG. 2 be the product of the noise signal ratio and the jitter which is applied to the bandwidth control circuit 36. The phase locked loop 22 of the system shown in FIG. 2 as well as the jitter detector 38 may be similar to the loop 22 and its components which have been described in connection with FIG. 1. Accordingly, like parts in FIG. 2 and FIG. 1 are labelled with like reference numerals. The loop 22 then provides the bit rate clock which is applied to data decision logic 180 to produce the output data. The data decision logic 180 may consist of a bit detector and code converter similar to the bit detector 40 and code converter 42 described in connection with FIG. 1.

The synchronizer systems shown in FIGS. 1 and 2 are preferably provided with tunable components in the matched filters, noise to signal generators, bandwidth control circuits and counters thereof. These components will therefore be tunable with bit rates of the data signal for which bit synchronism is to be acquired and held.

From the foregoing description it will be apparent that there has been described improved bit synchronizers which are adapted to the input signalling conditions so as to quickly acquire lock and maintain tracking in spite of the conflicting requirements of wide band width to follow jitter and narrow band width to hold lock under noisy conditions or under low transition density conditions. While preferred and exemplary embodiments of systems utilizing the invention have been described herein as well as different components which are suitable for use therein, variations in these herein-described systems and components, within the scope of the invention, will undoubtedly suggest themselves to those skilled in the art. For example, the matched filters and other components may be made manually coarse tunable to provide a system covering a wider range of bandwidth. Accordingly, the foregoing description should be taken merely as illustrative and not in any limiting sense.

APPENDIX $$T = \frac{4(\Delta f)^2}{B^3} \qquad (1)$$

$$T_{AV} = \frac{\pi}{4B} \exp\left[2\ S/N \text{ in the loop}\right] \qquad (2)$$

$$p(\tilde{\phi}/\phi_1,\phi_2) = p(\phi_1,\phi_2/\tilde{\phi})\,\frac{p_0(\tilde{\phi})}{p_0(\phi_1,\phi_2)} \qquad (3)$$

$$p(\phi_1,\phi_2/\tilde{\phi}) = \frac{1}{2\pi}\exp\left[-\frac{(\phi_1-\tilde{\phi})^2}{2\sigma_1^2} - \frac{(\phi_2-\tilde{\phi})^2}{2\sigma_2^2}\right] \qquad (4)$$

$$\phi = \frac{\sigma_2^2}{\sigma_1^2+\sigma_2^2}\,\phi_1 + \frac{\sigma_1^2}{\sigma_1^2+\sigma_2^2}\,\phi_2 \qquad (5)$$

$$\tilde{\phi} = a\phi_1 + (1-a)\phi_2 \qquad (6)$$

$$E = E\left\{(\phi-\tilde{\phi})^2 \middle| \phi_1,\phi_2\right\} = E\left\{\left[\phi - a\phi_1 - (1-a)\phi_2\right]^2 \middle| \phi_1,\phi_2\right\} \qquad (7)$$

$$E = E\left\{a^2(\phi-\phi_1)^2 \middle| \phi_1,\phi_2\right\} + E\left\{(1-a)^2(\phi_1-\phi_2)^2 \middle| \phi_1,\phi_2\right\} + E\left\{(1-a)a(\phi_1-\phi)(\phi_2-\phi) \middle| \phi_1,\phi_2\right\} \qquad (8)$$

APPENDIX – Continued $$E = a^2 \sigma_1^2 + (1-a)^2 \sigma^2 \qquad (9)$$

$$a = \frac{\sigma_2^2}{\sigma_1^2 + \sigma_2^2} \qquad (9a)$$

$$\tilde{\emptyset} = \frac{\sigma_2^2}{\sigma_1^2 + \sigma_2^2}\,\emptyset_1 + \frac{\sigma_1^2}{\sigma_1^2 + \sigma_2^2}\,\emptyset_2 \qquad (9b)$$

$$K(w) = \frac{S_m(w)}{S_m(w) + S_n(w)} \qquad (10)$$

$$S_m(w) = \frac{a^2}{\tau^2 w^2 + 1} \qquad (11)$$

$$\emptyset_{11}(\tau) = \int_{-\infty}^{\infty} h_{opt}(\chi)\left[\emptyset_{11}\,(\tau-\chi) + \emptyset nn(\tau-\chi)\right] d\chi \quad \text{for } \tau > 0 \qquad (12)$$

$$J = \int_0^{\tau} h(\tau-t)\, f'(t)\, dt + \lambda_1 \int_0^{\tau} h(\tau-t)\, f(t)\, dt + \lambda_2 \int_0^{\tau} h^2(\tau-t)\, dt \qquad (13)$$

$$h(\tau-t) = C_1 f(t) + C_2 f'(t) \qquad (14)$$

$$h(\tau-t) = C f(t) \qquad (15)$$

$$H_1(S) = \frac{1-e^{-\tau S}}{S} \qquad (16)$$

$$H_2(S) = \frac{1-2e^{\frac{-\tau S}{2}} + e^{-\tau S}}{S} \qquad (17)$$

$$H_1(S) = \frac{2}{S}\,\frac{1}{1+\coth(\tau S/2)} \qquad (18)$$

$$H_2(S) = \frac{4}{S}\,\frac{\sinh^2\left(\frac{\tau S}{4}\right)\Big/\sinh\left(\frac{\tau S}{2}\right)}{1+\coth\left(\frac{\tau S}{2}\right)} \qquad (19)$$

$$\coth(\tau S/2) \qquad (20a)$$

$$\sinh^2\left(\frac{\tau S}{4}\right)\Big/\sinh\left(\frac{\tau S}{2}\right) \qquad (20b)$$

$$\coth\left(\frac{\tau S}{2}\right) \cong \frac{2}{\tau S} + \sum_{k\ \text{even}} \frac{\frac{4}{\tau}\,S}{S^2 + k\,\frac{2\pi^2}{\tau^2}} + C_1 S \qquad (21)$$

$$\sinh^2\left(\frac{\tau S}{4}\right)\Big/\sinh\left(\frac{\tau S}{2}\right) \cong \sum_{k=2,6,10\ldots\ldots} \frac{\frac{4}{\tau}\,S}{S^2 + \frac{k^2\pi^2}{\tau^2}} + C_2 S \qquad (22)$$

$$\coth\frac{\tau S}{2} \cong \frac{2}{\tau S} + \frac{\frac{4}{\tau}S}{S^2+\frac{4\pi^2}{\tau^2}} + \frac{2\tau S}{3\pi^2} \quad (23)$$

$$\sinh^2\left(\frac{\tau S}{4}\right)\Big/\sinh\left(\frac{\tau S}{2}\right) \cong \frac{\frac{4}{\tau}S}{S^2+\frac{4\pi^2}{\tau^2}} + \frac{.71\tau S}{3\pi^2} \quad (24)$$

$$\coth\left(\frac{\tau S}{2}\right) \cong \frac{2}{S} + \frac{\frac{4}{\tau}S}{S^2+\frac{4\pi^2}{\tau^2}} + \frac{\frac{4}{\tau}S}{S^2+\frac{16\pi^2}{\tau^2}} + \frac{.4\tau S}{\pi^2} \quad (25)$$

$$E(t) = \sum_{1}^{n} a_k \sin\frac{2k\pi t}{\tau} \quad (26)$$

$$h(\tau-t) = \sum_{n+1}^{m} b_k \cos(2k\pi t/\tau) \quad 0 \leq t \leq \tau \quad (27)$$

$$\int_0^{\tau/2} \sin\frac{2k\pi t}{\tau} \sum_{n+1}^{m} bj \cos\frac{2j\pi t}{\tau}\, dt \quad (28)$$

$$\int_0^{\tau/2} \sin 2i\frac{\pi t}{\tau} \sum_{n+1}^{m} b_j \cos\frac{2j\pi t}{\tau}\, dt = 0 \quad (29)$$

$$bj = \frac{k}{j^2-k^2} + \sum_{\substack{i\geq 1\\ i\neq k}}^{i\leq n} \lambda i \frac{i}{j^2-i^2} \quad (30)$$

$$0 = \sum_j bj \frac{h}{j^2-h^2} = \sum_j \frac{kh}{(j^2-k^2)(j^2-h^2)} + \quad (31)$$

$$\sum_j \sum_{\substack{i\geq 1\\ i\neq k}}^{i\leq n} \frac{i\lambda_i h}{(j^2-i^2)(j^2-h^2)}$$

$$f_1 = \int\int \overline{h_1(x)h_1(y)[S_1(t-x)+N(t-x)][S_1(t-y)+N(t-y)]}^{\,t}\, dxdy \quad (32)$$

$$f_1 = \eta + S_0^2 \int R_{11}^2(x)\, dx \quad (33)$$

$$f_2 = \eta + S_0^2 \int R_{11}(x) R_{22}(x)\, dx \quad (34)$$

$$R_{11}(t) = 1 - \left|\frac{t}{\tau}\right| \quad \text{for } 0 \leq |t| \leq \tau \quad (35)$$

$$= 0 \qquad \tau \leq |t|$$

APPENDIX – Continued $$R_{22} = 1 - 3\left|\frac{t}{\tau}\right| \qquad 0 \le |t| \le \frac{\tau}{2} \qquad (36)$$

$$= \left|\frac{t}{\tau}\right| - 1 \qquad \frac{\tau}{2} \le |t| \le \tau$$

$$= 0 \qquad \tau \le |t|$$

$$f_1 = \eta + \frac{2}{3} S_0^2 \qquad (37)$$

$$f_2 = \eta + \frac{1}{6} S_0^2$$

$$N/S = (4f_2 - f_1)/6(f_1 - f_2) \qquad (38)$$

$$C_F = x_1 x_2 y_1 \overline{y_2} + \overline{x_1} x_2 y_1 y_2 + \overline{x_1}\,\overline{x_2}\,\overline{y_1} y_2 + x_1 \overline{x_2}\,\overline{y_1}\,\overline{y_2} \qquad (39)$$

$$C_S = x_1 x_2 \overline{y_1} y_2 + \overline{x_1} x_2 \overline{y_1}\,\overline{y_2} + \overline{x_1}\,\overline{x_2} y_1 \overline{y_2} + x_1 \overline{x_2} y_1 y_2 \qquad (40)$$

$$C_F = \overline{(x_2 \oplus y_1)}\ (x_1 \oplus Y_2) \qquad (41)$$

$$C_S = (x_2 \oplus y_1)\ \overline{(x_1 \oplus Y_2)} \qquad (42)$$

What is claimed is:

1. A system for acquisition of data transmitted in the form of repetitive input data signals having successive signalling intervals of equal duration during which data signals representing different data can be transmitted, changes in the state of said data being represented by transitions in said data signals, said system comprising a. a filter matched to signals which are orthogonal to said data signals, said data signals being applied to said filter, b. first circuit means connected to said filter for providing a first error signal having an amplitude which is a measure of the noise to signal characteristic of said data signal, c. a phase locked loop having a phase detector which provides an error voltage to control the phase of output signals produced by a voltage controlled oscillator, which is coupled to said phase detector, and also having means in said loop for controlling the bandwidth thereof, d. means connected to said filter and being coupled to said phase detector for detecting said transitions and locking said loop in response thereto, e. means coupled to said loop for providing a second error signal having an amplitude which is a measure of the rms variations in frequency of said output signal, f. means for applying said first and second error signals to said bandwidth control means for adapting said loop for changes in the noise in said data signals and error in the frequency of said signalling intervals thereof, and g. means for detecting the data represented by said data signals synchronously with said output signals.

2. A system for producing output signals synchronously with periodic input signals having transitions which occur at intervals related to the period of said input signals, said system comprising a. means including a phase locked loop for generating said output signals, b. means responsive to said input signals for providing a fist output corresponding to the noise to signal ratio of said input signals and a second output corresponding to said transitions, c. means coupled to said loop for generating a third output corresponding to the variations in frequency of said loop output signals, d. means responsive to said second output for phase locking said loop to said transitions, and e. means responsive to said first and third outputs for varying the bandwidth of said loop inversely with said noise to signal ratio and directly with said frequency variations so as to adapt said loop to independently accommodate for conditions of noise and frequency filter in said input signal.

3. The invention as set forth in claim 2 wherein said input signal responsive means includes a matched filter means having a response matched to signals orthogonal to said input signals.

4. The invention as set forth in claim 3 wherein said input signals are data signals coded in accordance with one of the NRZ and split phase codes, and said filter response is matched to data signals coded in accordance with the other of said NRZ and split phase codes.

5. The invention as set forth in claim 2 wherein said input signal responsive means includes circuit means for providing a maximum amplitude output signal coincident with said transitions.

6. The invention as set forth in claim 3 wherein said matched filter means includes a first network having said response matched to signals orthogonal to said input signals and a second network having a response matched to said input signals, means connected to said first and to said second network for providing said first output, and means connected to said first network for providing said second output.

7. The invention as set forth in claim 6 wherein said means connected to said first and second network which provides said first output includes first square law average circuit means connected to said first network and second square law average circuit means connected to said second network, and means for dividing 6 times the difference between said second and first square law average circuit outputs by the difference between four times said second square law average circuit output and said first square law average circuit outputs to provide said first output.

8. The invention as set forth in claim 3 wherein said input signal responsive means further comprises, detector means responsive to said matched filter output for providing a signal which is a function of the level of said input signal and the noise accompanying said input signal, clipping circuit means for providing another signal which is principally a function of the level of said input signal alone, and means for dividing the difference between said detector means and clipping means signals by said clipping means signal to provide said first output.

9. The invention as set forth in claim 8 wherein said phase locked loop includes a phase detector which provides said loop locking means, said bandwidth varying means, a voltage controlled oscillator, and means for applying said output signal to said phase detector; said input signal responsive means responsive to said second output includes peak detector means for generating signals occurring at the peaks of matched filter output; and means for applying said last named signals to said phase detector as said second output.

10. The invention as set forth in claim 8 wherein said phase locked loop includes a phase detector which receives said second output and provides said loop locking means, said bandwidth varying means, a voltge controlled oscillator for generating said output signal, and means for applying said oscillator signal also to said phase detector, and wherein said means coupled to said loop for generating said third output includes means for detecting variations in the amplitude of voltage which controls said oscillator for providing said third output.

11. The invention as set forth in claim 10 wherein said amplitude variations detecting means includes circuit means for providing an output which varies with the square of the amplitude of the input thereto, means for a.c. coupling said oscillator control voltage to said last named circuit means.

12. The invention as set forth in claim 10, wherein said bandwidth varying means includes means for multiplying said first output and said third output with one of said first and third outputs being the inverse of the other, and means for controlling the gain of said loop as a function of said multiplying means output.

13. The invention as set forth in claim 10 wherein said bandwidth varying means includes a variable bandwidth filter having a resistor which determines the bandwidth thereof, said resistor havine resistance which is dependent upon the intensity of illumination thereof, a source of illumination for said resistor and means for varying the intensity of said source directly as a function of said first output and inversely as a function of said third output.

14. The invention as set forth in claim 6 wherein said phase locked loop includes a phase detector which provides said loop locking means, said bandwidth varying means, a voltage controlled oscillator, and means for applying said output signal to said phase detector; said input signal responsive means responsive to said second output includes peak detector means for generating signals occurring at the peaks of matched filter output; and means for applying said signals from said peak detector means to said phase detector as said second output.

15. The invention as set forth in claim 6 wherein said phase locked loop includes a phase detector which receives said second output and provides said loop locking means, said bandwidth varying means, a voltage controlled oscillator for generating said output signal, and means for applying said oscillator signal also to said phase detector, and wherein said means coupled to said loop for generating said third output includes means for detecting variations in the amplitude of the voltage which controls said oscillator for providing said third output.

16. The invention as set forth in claim 15 wherein said amplitude variations detecting means includes circuit means for providing an output which varies the square of the amplitude of the input thereto, means for a.c. coupling said oscillator control voltage to said last named circuit means.

17. The invention as set forth in claim 15, wherein said bandwidth varying means includes means for multiplying said first output and said third output with one of said first and third outputs being the inverse of the other, and means for controlling the gain of said loop as a function of said multiplying means output.

18. The invention as set forth in claim 15 wherein said bandwidth varying means includes a variable bandwidth filter having a resistor which determines the bandwidth thereof, said resistor having resistance which is dependent upon the intensity of illumination thereof, a source of illumination for said resistor and means for varying the intensity of said source directly as a function of said first output and inversely as a function of said third output.

19. The invention as set forth in claim 3 wherein said phase locked loop comprises a phase detector which provides said loop locking means, said bandwidth control means, a voltage controlled oscillator which provides said output signal and means for applying said output signal to said phase detector, and wherein means are provided also responsive to said second output for detecting variations in the frequency thereof and generating an error signal corresponding to said frequency variations, and means in said loop for applying said frequency error signal to control the frequency of said oscillator.

20. The invention as set forth in claim 19 wherein said applying means for said frequency error signal comprises a summing circuit in said loop to which said phase detector output and said frequency error signal are applied, said summing circuit being output connected to said bandwidth control means.

21. The invention as set forth in claim 3 further comprising means coupled to the input of said matched filter and responsive to said matched filter output for controlling the amplitude of said input signal at the input of said matched filter.

22. The invention as set forth in claim 21 wherein said amplitude control means comprises a variable gain amplifier for applying said input signal to said matched filter input, and means responsive to the average value of the difference between portions of said matched filter output which exceed a first scalar level and portions of said matched filter output which exceed a second scalar level greater than said first level for generating a signal for controlling the gain of said amplifier.

23. The invention as set forth in claim 22 wherein said matched filter includes a first network having said response matched to signals orthogonal to said input signals and a second network having a response matched to said input signals, said first network providing said matched filter output means responsive to said first network output for providing said input signal responsive means first and second outputs, and means responsive to said second matched filter network output and to said second output for controlling the d.c. offset of the input signals at the input of said matched filter.

24. The invention as set forth in claim 23 wherein said d.c. offset control means includes a drift control circuit connected between said variable gain amplifier and said matched filter input, and means for sampling said second network output during the interval of said second output and providing a signal corresponding to the average value thereof for controlling said drift control circuit.

* * * * *